United States Patent Office 3,705,883
Patented Dec. 12, 1972

3,705,883
THERMALLY STABLE VINYL CHLORIDE COPOLYMERS
Frank Wingler and Karola Brudermanns, Leverkusen, and Herbert Bartl, Odenthal-Hahnenberg, Germany, assignors to Bayer Aktiengesellschaft, Leverkusen, Germany
No Drawing. Filed Feb. 2, 1971, Ser. No. 112,066
Claims priority, application Germany, Feb. 14, 1970, P 20 06 775.8
Int. Cl. C08f 15/40
U.S. Cl. 260—80.75                    3 Claims

ABSTRACT OF THE DISCLOSURE

Thermally stable vinyl chloride copolymers are obtained by copolymerising from 65 to 98.9 parts by weight of vinyl chloride, from 3 to 210 parts by weight of at least one α-olefin and from 0.5 to 5 parts by weight of a monoallyl or diallyl ether of a polyhydric alcohol; said ether contains at least one hydroxyl group.
Polymerising occurs in bulk, emulsion or suspension at a temperature of from 0 to 60° C. and at a pressure of from 5 to 200 atms. and in the presence of a radical initiator.

---

This invention relates to thermally stable copolymers of vinyl chloride, α-olefins and an allyl ether of an aliphatic or cycloaliphatic polyhydric alcohol containing at least one hydroxyl group, and to a process for their production.

Polyvinyl cloride is known to have a very low thermal stability, and unstabilised polyvinyl chloride gradually gives off hydrogen chloride at temperatures as low as 100° C., changing colour as it does so, excessive discolouration being caused through the formation of double bonds. Accordingly, it is necessary before processing to add stabilisers which prevent the elimination of hydrogen chloride at the necessary processing temperatures.

It is also known that copolymerisable heavy metal stabilisers containing olefins groups such as for example lead salts of unsaturated acids or vinyl/tin derivatives, can be copolymerised with vinyl chloride in order to obtain internally stabilised vinyl chloride. Copolymerisable heavy metal stabilisers of this kind are often very expensive and interfere with the polymerisation reactions.

It is also known that non-copolymerisable stabilisers can be added to the monomer before polymerisation. Stabilisers of this kind can also interfere with the polymerisation reaction.

It had also been found that copolymers of vinyl chloride and α-olefins, such as ethylene, α-butylene or iso butylene, which have acquired particular interest by virtue of their outstanding processing properties, show an even greater tendency to give off hydrogen chloride under heat than homopolyvinyl chloride itself. Even after the addition of stabilisers, it is often impossible to process copolymers of this kind at elevated temperatures of the kind that occur for example in extruders, without discolouration and the elimination of hydrogen chloride.

Accordingly, the object of the invention was to find vinyl chloride/α-olefin copolymers that are more stable to heat, and a process by which they could be produced.

This object was achieved by copolymerising vinyl chloride with the α-olefins in the presence of relatively small quantities of a mono or diallyl ether of a polyhydric alcohol, which ether contains at least one hydroxyl group.

Accordingly, the present invention relates to a process for the production of thermally stable vinyl chloride/α-olefin copolymers, which comprises copolymerising from 65 to 98.9 parts by weight of vinyl chloride,
from 3 to 210 parts by weight of one or more α-olefins, and
from 0.5 to 5 parts by weight of a monoallyl of diallyl ether of a polyhydric aliphatic or cycloaliphatic alcohol, which ether contains at least one hydroxyl group, by bulk, emulsion or suspension polymerisation, at a temperature of from 0 to 60° C. and at a pressure of from 5 to 200 atms. in the present of a radical initiator.

In the context of this invention, are preferred those α-olefins containing 2 to 12 carbon atoms, for example ethylene, propylene, α-butylene, isobutylene, α-heptene, tripropylene, tetrapropylene, and mixtures thereof.

When mixtures of ethylene and one or more other α-olefins are used, the proportion in which the other olefin(s) is/are present amounts to 50% by weight of the ethylene component. Mixtures of ethylene and propylene are preferred.

From 3 to 210 parts by weight, preferably 3 to 105 parts by weight, of one or more α-olefins are used to 65 to 98.9 parts by weight, preferably 80 to 98.5 parts by weight of vinyl chloride. The allyl ether is added to the polymerisation mixtures, before polymerisation, in quantities of from 0.5 to 5 parts by weight. From about 1 to 30% by weight of the quantity of α-olefin used are incorporated in the copolymer, depending upon the temperature and pressure.

The allyl ethers of a polyhydric alcohol containing at least one hydroxyl group are derived from aliphatic or cycloaliphatic polyhydric alcohols, preferably from aliphatic polyhydric alcohols with 2 to 8 carbon atoms. The following are examples of such ethers: ethylene glycol monoallyl ether, 1,2-propylene glycol monoallyl ether, 1,3-propylene glycol monoallyl ether, 1,4-butylene glycol monoallyl ether, 2,3-butylene glycol monoallyl ether, glycerol monoallyl ether, trimethylol propane monoallyl ether, and trimethylol propane diallyl ether.

It is possible by virtue of the process according to the invention to obtain copolymers consisting of copolymerised units of about 65 to 98.9% by weight, preferably from 82 to 98.5% by weight of vinyl chloride,
from 1 to 30% by weight, preferably from 1 to 15% by weight of α-olefin, and
from 0.1 to 5% by weight, preferably from 0.5 to 3% by weight of an allyl ether of a polyhydric alcohol, which ether contains at least one hydroxyl group.

The monomers can be copolymerised in bulk, emulsion or in suspension. Suspension copolymerisation is preferred. The copolymerisation reaction is carried out at a temperature from 0 to 60° C., preferably from 30 to 50° C., and at a pressure of from about 5 to 20 atms., preferably from 5 to 70 atms.

The copolymerisation reaction is initiated by substances which form free radicals. When polymerisation is carried out in bulk, the initiators used are the same as those used for suspension polymerisation. Examples of initiators such as these include α,α-azodiisobutyronitrile; tert.-butyl perpivalate; lauroyl peroxide; diisooctyl peroxide; alkyl or cycloalkyl peroxydicarbonates, such as diisopropyl peroxydicarbonate, diisooctyl peroxydicarbonate or dicyclohexyl peroxydicarbonate; and alkyl or cycloalkyl sulphonyl peranhydrides of an aliphatic carboxylic acid containing 2 to 8 carbon atoms, such as isopropyl sulphonyl peracetate or cyclohexyl sulphonyl peracetate.

The initiators for bulk and suspension polymerisation are preferably used in quantities of from 0.1 to 1.5% by weight, based on vinyl chloride.

Polymerisation in aqueous suspension can be carried out in the presence of from 0.1 to 1% by weight based on vinylchloride of a surfactant such as gelatine, alkyl-methyl cellulose, partially hydrolysed vinyl acetate polymers, and the like.

The weight ratio of the aqueous phase to that of the vinyl chloride should be essentially from 1:1 to 3:1 for suspension and emulsion polymerisation. The polymerisation mixtures can also contain the conventional stabilisers, wetting agents and other substances. The emulsion polymerisation reaction is carried out in the presence of water-soluble substances forming free radicals, preferably peroxy compounds such as potassium, sodium or ammonium peroxydisulphate, perborates and hydrogen peroxide. Water soluble peroxidic compounds can also be used in the form of Redox systems, i.e. in combination with reducing agents, in known manner. Examples of suitable reducing agents include sodium pyrosulphite or bisulphite, sodium formaldehyde sulphoxylate or triethanolamine. The catalysts are preferably used in quantites of from 0.1 to 4% by weight, based on the vinyl chloride used.

Cationic, anionic or non-ionic emulsifiers may be used as emulsifiers for the emulsion polymerisation reaction in preferred quantities of from 1 to 20% by weight, especially in quantities of from 1 to 10% by weight, based on the total quantity of monomers.

Examples of suitable anionic emulsifiers include higher fatty acid, resin acids, acid fatty alcohol sulphuric acid esters, higher alkyl sulphonates and alkylaryl sulphonates, sulphonated castor oil, higher oxyalkyl sulphonates, sulphosuccinic acid, salts of fatty acid condensation products with oxyalkyl carboxylic acids, aminoalkyl carboxylic acids, and the water-soluble salts of sulphonated ethylene oxide adducts.

Examples of cationic emulsifiers include salts of alkyl amines, aryl-, alkylaryl- or resin amines and inorganic acids, and salts of quaternary ammonium compounds.

Suitable non-ionic emulsifiers include the reaction products known per se of ethylene oxide with long-chain fatty alcohols such as cetyl, lauryl, oleyl or octadecyl alcohol, or phenols such as octyl or dodecyl phenyl; reaction products of more than 10 mols, and preferably from 15 to 30 mols, of ethylene oxide with 1 mol of fatty alcohol or phenol being particularly suitable.

The allyl ethers are present in the copolymers in quantities of from 0.1 to 5% by weight, based on copolymer. In these amounts, there is no noticeable molecular-weight-regulating or plasticising effect. For example, a copolymer of 96% by weight of vinyl chloride and 4% by weight of ethylene obtained by suspension polymerisation in the absence of allyl ethers has an intrinsic viscosity of 1.3 dl./g. (100 ccm./gram), whilst a copolymer of 94% by weight of vinyl chloride, 4% by weight of ethylene and 2% by weight of trimethylol propane monoallyl ether, obtained under the same polymerisation conditions, has an intrinsic viscosity of 1.26 dl./g., measured at 25° C. in cyclohexanone. A proportion of allyl ether greater than 5% by weight does not produce any appreciable improvement in thermal stability, but leads to a reduction in intrinsic viscosity.

The vinyl chloride copolymers produced in accordance with the invention show an improved thermal stability and a lower tendency to discolour at elevated temperatures. The effect is actually noticeable at temperatures below 100° C. Whereas a vinyl chloride/ethylene copolymer containing 4% by weight of ethylene, prepared in the absence of allyl ethers, gradually discolours after 5 hours in a recirculating air drying cabinet at 90° C. for example, copolymers with allyl ethers containing hydroxyl groups remain colourless.

Following the addition of the aids normally used in the processing of polyvinyl chloride, such as stabilisers, lubricants, refining agents, pigments, fillers and substances which increase impact strength, the copolymers according to the invention show a much higher level of stability during processing. They can be processed at elevated temperatures or for prolonged periods without showing any signs of decomposition.

The rough-sheet test can be used as a measure of thermal stability. In this test, a sample is rolled for a prolonged period at 160° C. and the discolouration of the sample assessed at certain time intervals. A copolymer consisting of copolymerised units of 94.5% by weight of vinyl chloride, 3.5% by weight of ethylene and 2% by weight of trimethylol propane monoallyl ether, does not show any signs of turning brown after rolling for 60 minutes at 160° C. There are still no signs of discolouration after another 2 hours in a recirculating air drying cabinet at 160° C. A copolymer which did not contain any allyl ether turned black after ageing for only 45 minutes in hot air although it had been otherwise similarly processed and aged.

The copolymers according to the invention can be converted into mouldings, films, sheets or profiles by injection-moulding, blow-moulding or calendering at temperatures from 80 to 180°. They can also be used in the production of plastisols and plasticiser mixtures. They have intrinsic viscosities of from 0.5 to 1.5 dl./g., as measured in cyclohexanone at 25° C. The percentages in the following examples are based on weight, unless otherwise stated.

COMPARISON EXAMPLE 1

16,000 cc. of desalted water were introduced into a 40 litre capacity autoclave, and 16 g. of methyl cellulose were dissolved therein. This was followed by the addition of 1.5 g. of a sulphonate of a fatty alcohol containing approximately 13 to 17 carbon atoms, 1.6 g. of sodium carbonate and 20 g. of a 1:1 mixture of cyclohexyl peroxydicarbonate with cyclohexyl sulphonyl peracetate. After flushing with ethylene, 8000 g. of vinyl chloride were introduced under pressure, heated to 35° C. and saturated with 20 atms. of ethylene. The mixture was then polymerised for 24 hours at an ethylene pressure kept constant at 20 atms. The suspension polymer was centrifuged off and dried at 50° C., in a recirculating air drying cabinet. A sample had an intrinsic viscosity $[\eta]$ of 1.4 dl./g. as measured in cyclohexanone at 25° C. The copolymer contained copolymerised units of 3% of ethylene and 97% of vinyl chloride.

A sample was mixed on mixing rolls for 60 minutes at 160° C. with 2% of complex barium/cadmium stabiliser, 0.5% of dodecyl phenyl phosphite, 0.5% of stearic acid methyl ester and 0.2% of low molecular weight polyethylene wax, and the resulting mixture was subsequently drawn into a 1 mm. thick sheet. During ageing of this sheet at 160° C. in a recirculating air drying cabinet, the originally yellow sample turned brown after only 15 minutes, and after 45 minutes was black and opaque.

EXAMPLE 1

The procedure was as in Comparison Example 1, except that 160 g. of trimethylol propane monoallyl ether were added before polymerisation. Working up and addition of the processing aids were carried out as in the comparison example. The copolymer contained copolymerised units of 3% of ethylene, 95% of vinyl chloride and 2% of trimethylol propane monoallyl ether. The copolymers had an intrinsic viscosity of 1.41 dl./g., as measured in cyclohexanone at 25° C.

After rolling for 60 minutes at 160° C., a sample was still completely colourless. The sample only discoloured (pale yellow) after 2 hours in a recirculating air drying cabinet.

EXAMPLE 2

The procedure was as in Example 1, except that the ethylene pressure was kept at 35 atms. The copolymer contained copolymerised units of 5% of ethylene, 92% of vinyl chloride and 2% of trimethylol propane monoallyl ether. It had an intrinsic viscosity of 1.2 dl./g. as measured in cyclohexanone at 25° C.

A sample did not show any signs of discolouration after rolling for 60 minutes at 160° C. Ageing in a recirculating air drying cabinet at 160° C. caused discolouration to yellow after 75 minutes and discolouration to brown after 2 hours. The sample only turned black after 2.5 hours.

EXAMPLE 3

The procedure was as in Example 1 except that the pressure was kept constant at 42 atms. of ethylene. The product contained, in copolymerised form, 9% of ethylene, 90% of vinyl chloride and 1% of trimethylol propane monoallyl ether; $[\eta]=0.8$ dl./g. as measured in cyclohexanone at 25° C.

The sample was still colourless after rolling for 60 minutes at 160° C. Ageing in hot air only produced yellowing after 90 minutes and browning after 120 minutes.

EXAMPLE 4

As described in Comparison Example 1, 16,000 cc. of desalted water, 16 g. of methyl cellulose, 1.6 g. of fatty alcohol sulphonate containing approximately 13 to 17 carbon atoms, 1.6 g. of sodium bicarbonate, 20 g. of an initiator mixture of cyclohexyl peroxydicarbonate and cyclohexyl sulphonyl peracetate in a ratio of 1:1, and 160 g. of trimethylol propane monoallyl ether, were introduced into a 40 litre capacity autoclave, the air was displaced with ethylene, and 8000 g. of vinyl chloride and 240 g. of propylene were introduced under pressure. The contents of the autoclave were then heated to 35° C. and saturated with 30 atms. of ethylene. After 24 hours, the reaction product was worked up as in Comparison Example 1, and rolled at 160° C. in the presence of the aforementioned processing aids. After rolling for 60 minutes at 160° C., a sample did not show any signs of discolouration. Ageing in hot air caused yellowing after 2 hours at 160° C. and browning after 2 hours 30 minutes.

The copolymer contained copolymerised units of 3.5% of ethylene and propylene, 95.3% of vinyl chloride and 1.2% of trimethylol propane monoallyl ether. The copolymer had an intrinsic viscosity of 0.78 dl./g., as measured at 25° C. in cyclohexanone.

EXAMPLE 5

The procedure was as in Example 3, except that 160 g. of 1-allyloxy-2-propanol were used instead of the trimethylol propane monoallyl ether. The copolymer contained copolymerised units of 2.5% of ethylene, 97% of vinyl chloride and 0.5% of 1-allyloxy-2-propanol. It had an intrinsic viscosity of 0.8 dl./g., as measured at 25° C. in cyclohexanone.

After 60 minutes at 160° C., a rolled sample did not show any signs of discolouration. Ageing in hot air caused yellowing after 180 minutes and browning after 210 minutes.

EXAMPLE 6

The procedure of Example 3 was repeated, employing 160 g. of ethylene glycol monoallyl ether. The copolymer contained copolymerised units of 2% of ethylene, 97.5% of vinyl chloride and 0.5% of ethylene glycol monoallyl ether. It had an intrinsic viscosity of 0.8 dl./g., as measured at 25° C. in cyclohexanone.

After rolling for 60 minutes at 160° C., a sample did not show any signs of discolouration. Ageing in hot air caused yellowing after 195 minutes and browning after 210 minutes.

What we claim is:

1. A thermally stable solid copolymer comprising polymerized units of 65 to 98.9% by weight of vinyl chloride, 1 to 30% by weight of an α-olefin having 2 to 12 carbon atoms and 0.1 to 5% by weight of an allyl ether of a polyhydric aliphatic or cycloaliphatic alcohol having 2 to 8 carbon atoms, said allyl ether containing at least one hydroxyl group and said percentages by weight being based on the total weight of the copolymer.

2. A thermally stable solid copolymer comprising polymerized units of 82 to 98.5% by weight of vinyl chloride, 1 to 15% by weight of an α-olefin having 2 to 12 carbon atoms and 0.5 to 3% by weight of an allyl ether of a polyhydric aliphatic or cycloaliphatic alcohol having 2 to 8 carbon atoms, said allyl ether containing at least one hydroxyl group and said percentages by weight being based on the total weight of the copolymer.

3. The copolymer of claim 2 wherein said allyl ether is trimethylol propane monoallyl ether.

References Cited

UNITED STATES PATENTS 3,501,440  3/1970  Kamio et al. _____ 260—77.5

JAMES A. SEIDLECK, Primary Examiner

S. M. LEVIN, Assistant Examiner

U.S. Cl. X.R.

260—32.8 R, 87.5 C, 897 C